United States Patent
Ahn et al.

(10) Patent No.: US 8,673,507 B2
(45) Date of Patent: Mar. 18, 2014

(54) INHIBITOR OF REDUCTION OF LIFE CYCLE OF REDOX SHUTTLE ADDITIVE AND NON-AQUEOUS ELECTROLYTE AND SECONDARY BATTERY COMPRISING THE SAME

(71) Applicant: LG Chem, Ltd., Seoul (KR)

(72) Inventors: Soon Ho Ahn, Daejeon (KR); Sung Hoon Yu, Daejeon (KR); Byung Hoon Oh, Seoul (KR); Joo Mi Jeon, Seoul (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/785,512

(22) Filed: Mar. 5, 2013

(65) Prior Publication Data

US 2013/0216898 A1 Aug. 22, 2013

Related U.S. Application Data

(63) Continuation of application No. 11/552,317, filed on Oct. 24, 2006.

(30) Foreign Application Priority Data

Oct. 24, 2005 (KR) ........................ 10-2005-0100000

(51) Int. Cl.
*H01M 6/14* (2006.01)
*H01M 6/16* (2006.01)

(52) U.S. Cl.
USPC ............................ 429/330; 429/329; 429/340

(58) Field of Classification Search
USPC .......................................... 429/329, 330, 340
See application file for complete search history.

(56) References Cited

U.S. PATENT DOCUMENTS

| | | |
|---|---|---|
| 4,857,423 A | 8/1989 | Abraham et al. |
| 5,709,968 A | 1/1998 | Shimizu |
| 5,879,834 A | 3/1999 | Mao |
| 5,882,812 A | 3/1999 | Visco et al. |
| 2002/0102466 A1 | 8/2002 | Hwang et al. |
| 2003/0054259 A1 | 3/2003 | Murai et al. |
| 2004/0072080 A1 | 4/2004 | Iwanaga et al. |
| 2004/0121239 A1 | 6/2004 | Abe et al. |
| 2005/0130035 A1 | 6/2005 | Inada et al. |
| 2005/0221196 A1 | 10/2005 | Dahn et al. |

FOREIGN PATENT DOCUMENTS

| | | |
|---|---|---|
| CN | 1398013 A | 2/2003 |
| CN | 1417881 A | 5/2003 |
| CN | 1498438 A | 5/2004 |
| JP | 7-302614 A | 11/1995 |
| JP | 2002-260725 A | 9/2002 |
| JP | 2003-217652 A | 7/2003 |
| JP | 2003-217654 A | 7/2003 |
| JP | 2003-257479 A | 9/2003 |
| JP | 2004-158213 A | 6/2004 |
| JP | 2004-281218 A | 10/2004 |
| JP | 2005-100851 A | 4/2005 |
| KR | 10-2001-0022904 A | 3/2001 |
| KR | 10-2002-0008705 A | 1/2002 |
| KR | 10-2002-0020698 A | 3/2002 |
| WO | WO 01/03226 A1 | 1/2001 |
| WO | WO 01/29920 A1 | 4/2001 |
| WO | WO 2005/099024 A2 | 10/2005 |

OTHER PUBLICATIONS

English machine translation of Iwahisa et al., JP 2004-158213A (2004).
English translation of Chinese Office Action for Appl. No. 200680039770.0 dated Jul. 17, 2009.
International Search Report for International Application No. PCT/KR2006/004315; Date of filing Oct. 23, 2006.
Korean Notice of Allowance dated Feb. 25, 2008 for Appl. No. 10-2005-0100000.
Notice of Decision for Patent; 9-5-2008-009560497; Feb. 25, 2008.
Notification of Second Office Action for Appl. No. 200680039770.0, The State Intellectual Property Office of the People's Republic of China, issued Jun. 23, 2010 (w/ English translation).
Quanchao et al, "Research Progress on Film Formation Additives for Li-ion Batteries," Chemistry Report, 2003, vol. 13 (cited in Chinese Office Action for Appl. No. 200680039770.0 dated Jul. 17, 2009).
Supplementary European Search Report dated Feb. 16, 2009 for Appl. No. 06799386.5.
Taiwan Office Action for Appl. No. 095139158 dated Feb. 3, 2010 (w/ English translation).

*Primary Examiner* — Peter F Godenschwager
(74) *Attorney, Agent, or Firm* — Birch, Stewart, Kolasch & Birch, LLP

(57) ABSTRACT

Disclosed is an inhibitor of the reduction of life cycle of a redox shuttle additive that undergoes oxidation-reduction cycling, the inhibitor being at least of one compound selected from the group consisting of vinylene carbonates, ethylene carbonates, cyclic sulfites and unsaturated sultones. Also, Disclosed is a non-aqueous electrolyte and secondary battery comprising the same inhibitor.

6 Claims, 4 Drawing Sheets

INHIBITOR OF REDUCTION OF LIFE CYCLE OF REDOX SHUTTLE ADDITIVE AND NON-AQUEOUS ELECTROLYTE AND SECONDARY BATTERY COMPRISING THE SAME

This application is a Continuation of co-pending U.S. application Ser. No. 11/552,317, filed Oct. 24, 2006. This application also claims the benefit of the filing date of Korean Patent Application No. 10-2005-0100000, filed on Oct. 24, 2005, in the Korean Intellectual Property Office, the disclosure of which is incorporated herein in its entirety by reference.

BACKGROUND OF THE INVENTION (a) Field of the Invention

The present invention relates to an inhibitor of the reduction of life cycle of a redox shuttle additive having an overcharge-preventing effect, and a non-aqueous electrolyte and secondary battery comprising the same.

(b) Description of the Related Art

These days, as a reduction in the size and weight of electronic systems is realized and the use of portable electronic devices is generalized, studies on secondary batteries having high energy density are being actively conducted.

A lithium secondary battery, which is currently used, is obtained by using materials capable of lithium ion intercalation/deintercalation as a cathode and an anode, and by injecting a non-aqueous electrolyte between the cathode and the anode. Such a lithium secondary battery generates electric energy via oxidation and reduction reactions induced by the lithium ion intercalation/deintercalation at the cathode and the anode.

However, such lithium secondary batteries have safety problems such as firing and explosion, which result from the use of the non-aqueous electrolyte, and such problems become more severe with an increase in the capacity density of the batteries. Specifically, if the batteries are overcharged to a voltage exceeding the conventional operational voltage, the cathode release an excess amount of lithium, which then produce dendrites on the anode to make the cathode and the anode thermally unstable, thus causing rapid exothermic reactions, including decomposition of the electrolyte. Due to such exothermic reactions, firing and bursting phenomena caused by thermal runaway occur in the batteries, thus causing a problem in the safety of the batteries.

Prior technologies suggested to solve the problem caused by the overcharge of the lithium secondary batteries are broadly classified into methods that use electronic circuits, and methods that use chemical reactions.

The methods that use electronic circuits are methods of mechanically interrupting an electric current by promoting the generation of gas when overcharge takes place. These methods have problems in that much cost is incurred and various limitations arise in processes for designing and fabricating the batteries.

The methods that use chemical reactions include a method to shutdown by fusing the separator, and a method in which an appropriate redox shuttle additive, i.e., an oxidation-reduction reagent that undergoes oxidation-reduction cycling, is added to the electrolyte.

The redox shuttle additive serves to raise the temperature within the battery in an early stage using heat generated from oxidative exothermic reactions so as to shutdown the pores of the separator, thus inhibiting overcharge reactions. Also, the redox shuttle additive protects a battery by consuming an overcharged electric current on the cathode surface upon overcharge and enables the battery to be reused out of the overcharge state.

In the methods using such a redox shuttle additive, the use of lithium halide salts was first attempted, but the volatility and reactivity of halogen in the form of oxide were pointed out as problems. U.S. Pat. No. 4,857,423 discloses a method using a ferrocene compound, but the method has disadvantages of the low oxidation potential, slow diffusion and low solubility of ferrocene.

Japanese Laid-Open Patent No. Hei 7-302614 discloses, as a redox shuttle additive, a compound comprising an alkyl group or methoxy group as an electron donor linked to a benzene ring. However, in this case, there is a problem in that the effect of the compound is insignificant at high current intensity, because the amount of an electric current capable of undergoing oxidation-reduction cycling is low. U.S. Pat. No. 5,709,968 discloses a compound comprising a halogen compound linked to said benzene compound, but this compound has a shortcoming in that it has a short lifespan when it is used as a redox shuttle additive, because it is highly reactive.

SUMMARY OF THE INVENTION

It is an object of the present invention to provide a substance which can be added to an electrolyte comprising a redox shuttle additive having an overcharge-preventing effect caused by oxidation-reduction cycling, so as to suppress a side reaction between the redox shuttle additive and an anode and to inhibit the reduction of the life cycle of the redox shuttle additive, as well as a non-aqueous electrolyte comprising said substance.

Another object of the present invention is to provide a secondary battery having high safety and excellent cycle characteristics and electrical capacities when overcharged, as well as a non-aqueous electrolyte which can be used in said secondary battery.

The present invention provides an inhibitor of the reduction of life cycle of a redox shuttle additive that undergoes oxidation-reduction cycling, the inhibitor being at least one compound selected from the group consisting of vinylene carbonates, ethylene carbonates, cyclic sulfites and unsaturated sultones, as well as a non-aqueous electrolyte and secondary battery comprising the same inhibitor. Also, the present invention provides a secondary battery including: an anode having thereon a film formed by an inhibitor of the reduction of life cycle of a redox shuttle additive; and an electrolyte containing the redox shuttle additive.

DETAILED DESCRIPTION OF THE INVENTION

Figure 1:
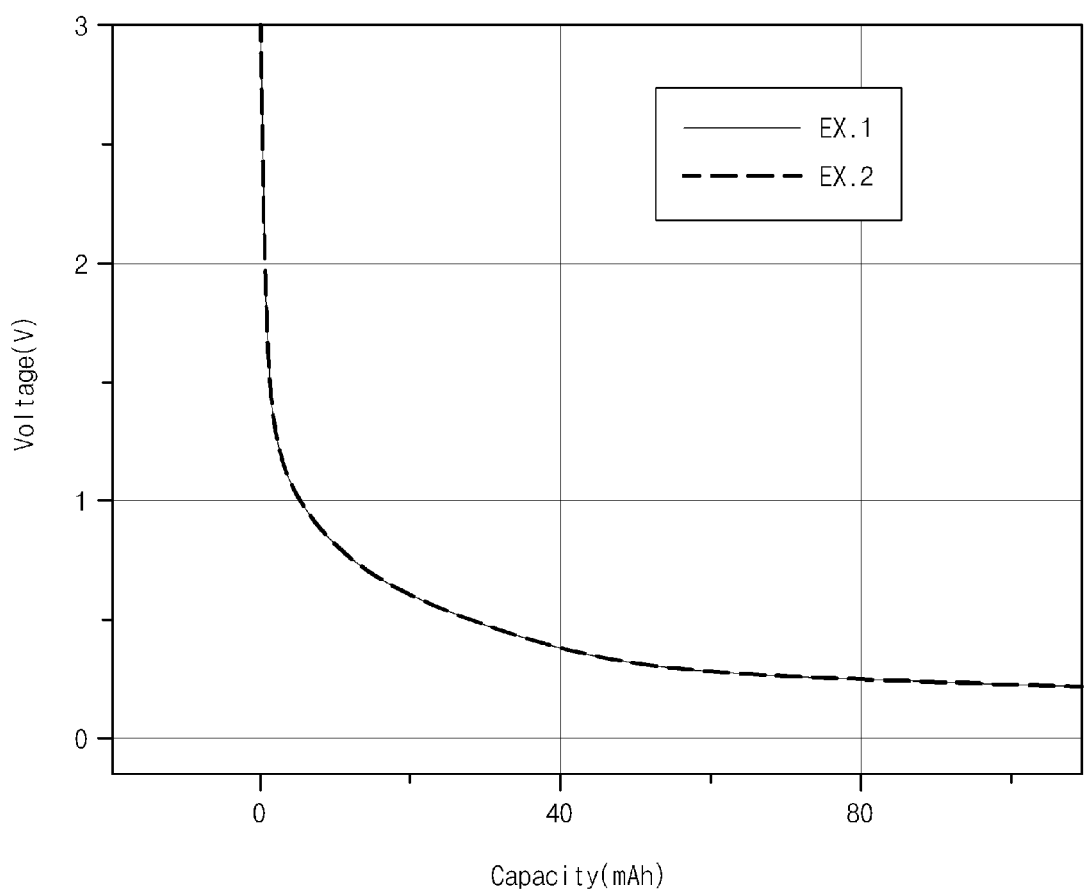
FIG. 1 is a graphic diagram showing the relationship between the capacity and voltage at the anode upon charge of batteries fabricated in Examples 1 and 2 of the present invention.

Hereinafter, the present invention will be described in detail.

A redox shuttle additive, which is added to an electrolyte to prevent overcharge in a secondary battery, protects the battery by consuming an overcharge current on the cathode surface and enables the battery to be reused out of overcharge conditions. However, the present inventors have found that, because the redox shuttle additive in the electrolyte reacts with the anode, the life cycle of the redox shuttle additive of maintaining the safety of the battery through oxidation-reduction cycling upon overcharge is not sustained for a long time, and particularly, as the reaction between the redox shuttle additive and the anode increases, the life cycle of the redox shuttle additive decreases.

Also, the present inventors have found that, when at least one compound selected from the group consisting of vinylene carbonates, ethylene carbonates, cyclic sulfites and unsaturated sultones is added to the electrolyte, the reaction between the redox shuttle additive and the anode can be inhibited, and the reduction of life cycle of the redox shuttle additive that undergoes oxidation-reduction cycling can be inhibited. When the inventive inhibitor is used, a protective film can be formed on the surface of the anode, and thus the anode can also be protected. Also, the stability of the battery upon overcharge can be improved by increasing the life cycle of the redox shuttle additive in the electrolyte.

As vinylene carbonates in the present invention, compounds represented by following Formula 1 can be used, and preferred examples of vinylene carbonates include vinylene carbonate, fluorovinylene carbonate, methylvinylene carbonate, fluoromethylvinylene carbonate, ethylvinylene carbonate, propylvinylene carbonate, butylvinylene carbonate, dimethylvinylene carbonate, diethylvinylene carbonate, dipropylvinylene carbonate and the like:

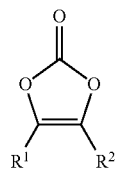

[Formula 1]

wherein $R^1$ and $R^2$ each independently represents hydrogen, halogen, or an alkyl group having 1~12 carbon atoms.

As ethylene carbonates, compounds represented by following Formula 2 can be used, and preferred examples of ethylene carbonates include fluoroethylene carbonate, vinylethylene carbonate, prophenylethylene carbonate, 4,4-divinylethylene carbonate, 4,5-divinylethylene carbonate, 4-methyl-4-vinylethylene carbonate, 4-fluoro-4-vinylethylene carbonate, 4-methyl-5-vinylethylene carbonate, 4-ethyl-4-vinylethylene carbonate and the like:

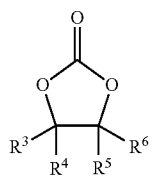

[Formula 2]

wherein $R^3$ to $R^6$ each independently represents hydrogen, halogen, an alkenyl group having 2~12 carbon atoms, or an alkyl group having 1~12 carbon atoms, and at least one of $R^3$ to $R^6$ is halogen or an alkenyl group having 2~12 carbon atoms.

As cyclic sulfites, compounds represented by following Formula 3 can be used, and preferred examples of cyclic sulfites include ethylene sulfite, methylethylene sulfite, ethylethylene sulfite, 4,5-dimethylethylene sulfite, 4,5-diethylethylene sulfite, 4,5-dimethylpropylene sulfite, 4,5-diethylpropylene sulfite, 4,6-dimethylpropylene sulfite, 4,6-diethylpropylene sulfite and the like:

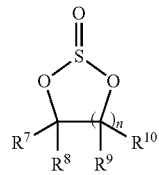

[Formula 3]

wherein $R^7$ to $R^{10}$ each independently represents hydrogen, halogen, or an alkyl group having 1~12 carbon atoms, and n is an integer ranging from 1 to 3.

As unsaturated sultones, compounds represented by following Formula 4 can be used, and preferred examples thereof include ethene sultone, 1,3-propene sultone, 1,4-butene sultone, 1-methyl-1,3-propene sultone, and the like:

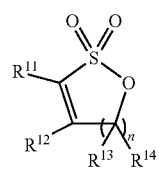

[Formula 4]

wherein $R^{11}$ to $R^{14}$ each independently represents hydrogen, halogen, or an alkyl group having 1~12 carbon atoms, and n is an integer ranging from 0 to 3.

Also, said vinylene carbonates, ethylene carbonates, cyclic sulfites and unsaturated sultones, which are used in the present invention, are compounds capable of protecting the anode by forming a film on the surface of the anode.

As the redox shuttle additive, an aromatic compound represented by following Formula 5 can be used:

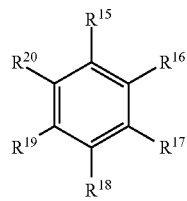

[Formula 5]

wherein $R^{15}$ to $R^{20}$ each independently represents hydrogen, halogen, aryl, an alkyl group having 1~12 carbon atoms, or an alkoxy group having 1~12 carbon atoms, and at least two of $R^{15}$ to $R^{20}$ are an alkoxy group having 1~12 carbon atoms.

It is preferable to use at least one aromatic compound selected from dimethoxybenzenes, in which two radicals of $R^{14}$ to $R^{19}$ in Formula 5 above represent a methoxy group, and the remaining radicals each independently represents hydrogen, halogen, aryl or an alkyl group having 1~12 carbon atoms. Examples of the aromatic compound include 2,5-ditertbutyl-1,4-dimethoxybenzene, 1,4-difluoro-2,5-dimethoxybenzene, 1,2-difluoro-4,5-dimethoxybenzene, and the like.

The inhibitor of the reduction of life cycle of the redox shuttle additive, which is at least one compound selected from the group consisting of vinylene carbonates, ethylene carbonates, cyclic sulfites and unsaturated sultones, can be used in an amount of 0.1~10 parts by weight based on 100 parts by weight of the total electrolyte containing the redox shuttle additive. If the inhibitor is used in an amount of less than 0.1 parts by weight, the effect of inhibiting the reduction of life cycle of the redox shuttle additive will be insignificant, and an excellent overcharge-preventing effect by the redox shuttle additive cannot be obtained. On the other hand, if the inhibitor is added in an amount of more than 10 parts by weight, the life cycle characteristic of the battery will be undesirably decreased.

The non-aqueous electrolyte according to the present invention can comprise: said inhibitor of the reduction of life cycle of a redox shuttle additive, which is at least one compound selected from the group consisting of vinylene carbonates, ethylene carbonates, cyclic sulfites and unsaturated sultones; the redox shuttle additive; a non-aqueous solvent; and an electrolyte salt.

As the redox shuttle additive in the non-aqueous electrolyte, at least one aromatic compound selected from compounds represented by above Formula 5, and preferably dimethoxybenzenes, can be used.

The redox shuttle additive can be contained in an amount of 0.1~20 parts by weight based on 100 parts by weight of the total electrolyte. If the content of the redox shuttle additive in the electrolyte is less than 0.1 parts by weight, the effect of the redox shuttle, i.e., an oxidation-reduction cycle, becomes weak, so that the overcharge-preventing effect thereof will be insignificant, and if the content exceeds 20 parts by weight, the life cycle characteristic of the battery will be decreased.

The non-aqueous solvent, which is contained in the inventive electrolyte, is not specifically limited, as long as it is conventionally used as a non-aqueous solvent for non-aqueous electrolytes. As the non-aqueous solvent, cyclic carbonate, linear carbonate, lactone, ether, ester and/or ketone can be used.

Examples of said cyclic carbonate include ethylene carbonate (EC), propylene carbonate (PC), butylene carbonate (BC) and the like, and examples of said linear carbonate include diethyl carbonate (DEC), dimethyl carbonate (DMC), dipropyl carbonate (DPC), ethyl methyl carbonate (EMC), methyl propylene carbonate (MPC) and the like. Examples of said lactone include gamma-butyrolactone (GBL), and examples of said ether include dibutylether, tetrahydrofuran, 2-methyltetrahydrofuran, 1,4-dioxane, 1,2-dimethoxyethane and the like. Also, examples of said ester include methyl acetate, ethyl acetate, methyl propionate, methyl pivalate and the like, and examples of said ketone include polymethylvinyl ketone. These non-aqueous solvents can be used alone or in a mixture of two or more thereof.

The electrolyte salt, which is used in the electrolyte, is not specifically limited, as long as it is conventionally used as an electrolyte salt for non-aqueous electrolytes. Non-limiting examples of the electrolyte salt include salts having a structure such as $A^+B^-$, in which $A^+$ includes alkaline metal cation such as $Li^+$, $Na^+$ or $K^+$, or combinations thereof, and $B^-$ includes anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ or $C(CF_2SO_2)_3^-$, or combinations thereof. Particularly, lithium salts are preferable. These electrolyte salts can be used alone or in a mixture of two or more thereof.

Also, the secondary battery according to the present invention comprises: a cathode; an anode; a separator; and said non-aqueous electrolyte.

The secondary battery according to the present invention can be fabricated by interposing a porous separator between the cathode and the anode and injecting said electrolyte into the resulting structure, according to a conventional method known in the art to which the present invention pertains. The method of fabricating the secondary battery is not specifically limited.

Moreover, the secondary battery according to the present invention may comprise: a cathode; an anode having thereon a film formed by said inhibitor of the reduction of life cycle of a redox shuttle additive; a separator; and an electrolyte containing the redox shuttle additive.

As the cathode active material used in the secondary battery of the present invention, a variety of lithium-transition metal composite oxides (e.g., lithium manganese composite oxide such as $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ ($0 \leq Y < 1$) $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<Z<2$ $LiCoPO_4$ or $LiFePO_4$, lithium nickel oxide, lithium cobalt oxide, and the foregoing oxides wherein part of manganese, nickel and cobalt is replaced with other transition metals and the like or a lithium-containing vanadium oxide and the like) or chalcogen compounds (such as manganese dioxide, titanium disulfide, molybdenum disulfide and the like) can be used.

As the anode active material, a carbon material, a lithium metal or an alloy thereof, which can absorb and release lithium ions, can be used. In addition, it is possible to use a metal oxide such as $TiO_2$ or $SnO_2$, which can intercalate and deintercalate lithium ions and has a potential of less than 2V for lithium. Particularly, a carbon material such as graphite is preferred.

Although there is no particular limitation on the separator which can be used in the present invention, it is possible to use a porous separator, examples of which include polypropylene-based, polyethylene-based, and polyolefin-based porous separators.

Furthermore, the appearance of the secondary battery according to the present invention is not specifically limited and can be a cylindrical shape using a can, a prismatic shape, a pouch shape or a coin shape.

Hereinafter, the present invention will be described in detail with reference to examples. However, it is to be understood that these examples are for illustrative purposes only and are not to be construed to limit the scope of the present invention.

Example 1

$LiPF_6$ was dissolved to a concentration of 1M in a non-aqueous solvent having a composition of ethylene carbonate (EC):ethyl methyl carbonate (EMC)=1:2(v:v). Then, 1 part by weight of vinylene carbonate and 3 parts by weight of 1,3-propene sultone were added to 100 parts by weight of the solution, thus preparing an electrolyte.

90 parts by weight of $LiFePO_4$ as a cathode active material, 5 parts by weight of acetylene black as a conducting agent, and 5 parts by weight of PVDF as a binder, were mixed with each other, and then added to NMP (N-methyl-2-pyrrolidone), to form cathode slurry. The slurry was applied on an aluminum (Al) collector and dried, thus preparing a cathode.

95 parts by weight of artificial graphite as an anode active material, and 5 parts by weight of PVDF as a binder were added to NMP to form anode slurry, which was then applied on a copper (Cu) collector and dried, thereby preparing an anode.

A polyolefin-based separator was interposed between the prepared cathode and anode, into which said electrolyte was then injected, thus fabricating a 323456-size pouch-type lithium secondary battery.

Example 2

A battery was fabricated in the same manner as in Example 1, except that the electrolyte was prepared by dissolving $LiPF_6$ to a concentration of 1 M in a non-aqueous solvent having a composition of ethylene carbonate (EC):ethyl methyl carbonate (EMC)=1:2 (v:v), adding 1 parts by weight of vinylene carbonate and 3 parts by weight of 1,3-propene sultone to 100 parts by weight of the solution, and adding 2 parts by weight of 2,5-ditertbutyl-1,4-dimethoxybenzene as a redox shuttle additive thereto.

Example 3

A battery was fabricated in the same manner as in Example 1, except that the electrolyte was prepared by dissolving $LiPF_6$ to a concentration of 1 M in a non-aqueous solvent having a composition of ethylene carbonate (EC):ethyl methyl carbonate (EMC)=1:2 (v:v), adding 1 part by weight of vinylene carbonate and 3 parts by weight of 1,3-propene sultone to 100 parts by weight of the solution, and adding 5 parts by weight of 1,4-difluoro-2,5-dimethoxybenzene as a redox shuttle additive thereto.

Example 4

A battery was fabricated in the same manner as in Example 1, except that the electrolyte was prepared by dissolving $LiPF_6$ to a concentration of 1 M in a non-aqueous solvent having a composition of ethylene carbonate (EC):ethyl methyl carbonate (EMC)=1:2 (v:v), adding 1 part by weight of vinylene carbonate and 3 parts by weight of 1,3-propene sultone to 100 parts by weight of the solution, and adding 5 parts by weight of 1,2-difluoro-4,5-dimethoxybenzene as a redox shuttle additive thereto.

Example 5

An electrolyte and a battery were prepared in the same manner as in Example 4, except that 5 parts by weight of vinyl ethylene carbonate was added instead of vinylene carbonate and 1,3-propene sultone.

Example 6

An electrolyte and a battery were prepared in the same manner as in Example 4, except that 5 parts by weight of ethylene sulfite was added instead of vinylene carbonate and 1,3-propene sultone.

Comparative Example 1

A battery was fabricated in the same manner as in Example 1, except that the electrolyte was prepared by dissolving $LiPF_6$ to a concentration of 1 M in a non-aqueous solvent having a composition of ethylene carbonate (EC):ethyl methyl carbonate (EMC)=1:2 (v:v).

Comparative Example 2

A battery was fabricated in the same manner as in Example 1, except that the electrolyte was prepared by dissolving $LiPF_6$ to a concentration of 1 M in a non-aqueous solvent having a composition of ethylene carbonate (EC):ethyl methyl carbonate (EMC)=1:2 (v:v), and then adding 2 parts by weight of 2,5-ditertbutyl-1,4-dimethoxybenzene as a redox shuttle additive to 100 parts by weight of the solution.

Comparative Example 3

A battery was fabricated in the same manner as in Example 1, except that the electrolyte was prepared by dissolving $LiPF_6$ to a concentration of 1 M in a non-aqueous solvent having a composition of ethylene carbonate (EC):ethyl methyl carbonate (EMC)=1:2 (v:v), and then adding 5 parts by weight of 1,4-difluoro-2,5-dimethoxybenzene as a redox shuttle additive to 100 parts by weight of the solution.

Comparative Example 4

A battery was fabricated in the same manner as in Example 1, except that the electrolyte was prepared by dissolving $LiPF_6$ to a concentration of 1 M in a non-aqueous solvent having a composition of ethylene carbonate (EC):ethyl methyl carbonate (EMC)=1:2 (v:v), and then adding 5 parts by weight of 1,2-difluoro-4,5-dimethoxybenzene as a redox shuttle additive to 100 parts by weight of the solution.

Test Example 1

In order to examine the relationship between capacity and voltage at the anode upon initial charge, the batteries fabricated in Examples 1 and 2 were tested by charging the batteries at 1/20 C for 40 hours, and then discharging the charged batteries at 1/20 C to 2.4 V. The test results are shown in FIG. 1. Also, the batteries fabricated in Comparative Examples 1 and 2 were tested according to the same method as described above, and the test results are shown in FIG. 2.

Figure 2:
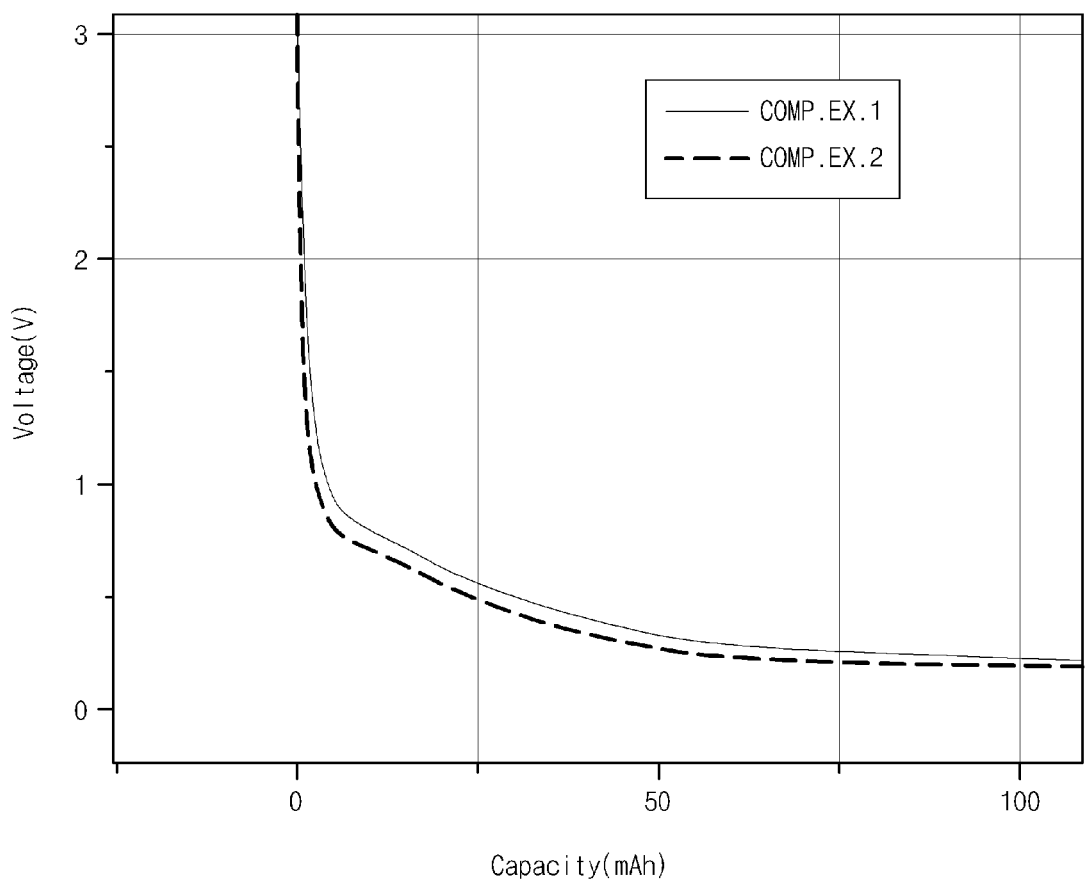
FIG. 2 is a graphic diagram showing the relationship between the capacity and voltage at the anode upon the charge of batteries fabricated in Comparative Examples 1 and 2 of the present invention.

In FIG. 2, it can be seen that, in the case where the redox shuttle additive was added (Comparative Example 2) and the case where the redox shuttle additive was not added (Comparative Example 1), there was a difference in the voltage versus capacity therebetween, that is, the voltage versus capacity of Comparative Example 2 was lower than that of Comparative Example 1, suggesting that there was a reaction between the redox shuttle additive and the anode. On the other hand, in FIG. 1 relating to the use of the electrolytes containing the vinylene carbonate and propylene sultone, similar graphs were shown without regard to the addition of the redox shuttle additive, suggesting that the reaction between the redox shuttle additive and the anode was inhibited.

Test Example 2

The charge and discharge of the batteries fabricated in Examples 2 to 4 were conducted in the following conditions, and the relationship between time and voltage for the batteries was shown in FIG. 3. The charge was conducted at a current intensity of 21.25 mA (0.05 C) for 40 hours, and the discharge was conducted at a current intensity of 21.25 mA (0.05 C) to 2.4 V.

Figure 4:
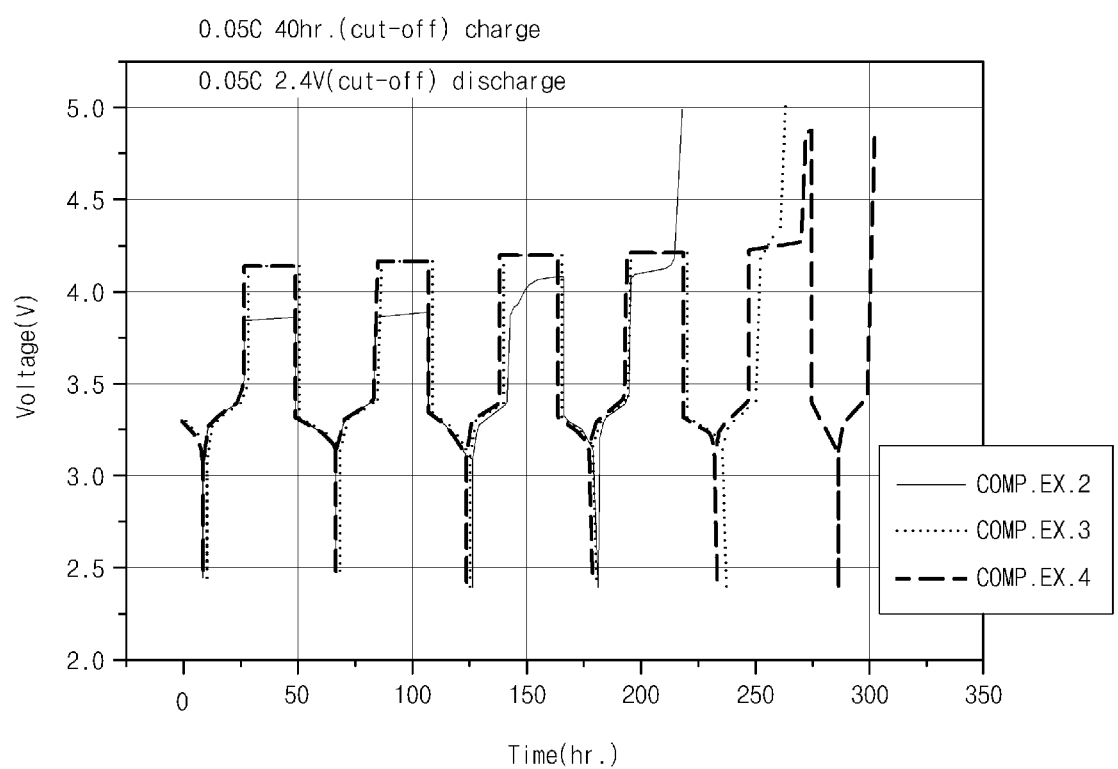
FIG. 4 is a graphic diagram showing the relationship between time and voltage according to the charge and discharge of batteries fabricated in Comparative Examples 2 to 4 of the present invention.

The charge and discharge of the batteries fabricated in Comparative Examples 2 to 4 were conducted in the same conditions as described above, and the relationship between time and voltage for the batteries was shown in FIG. 4.

Figure 3:
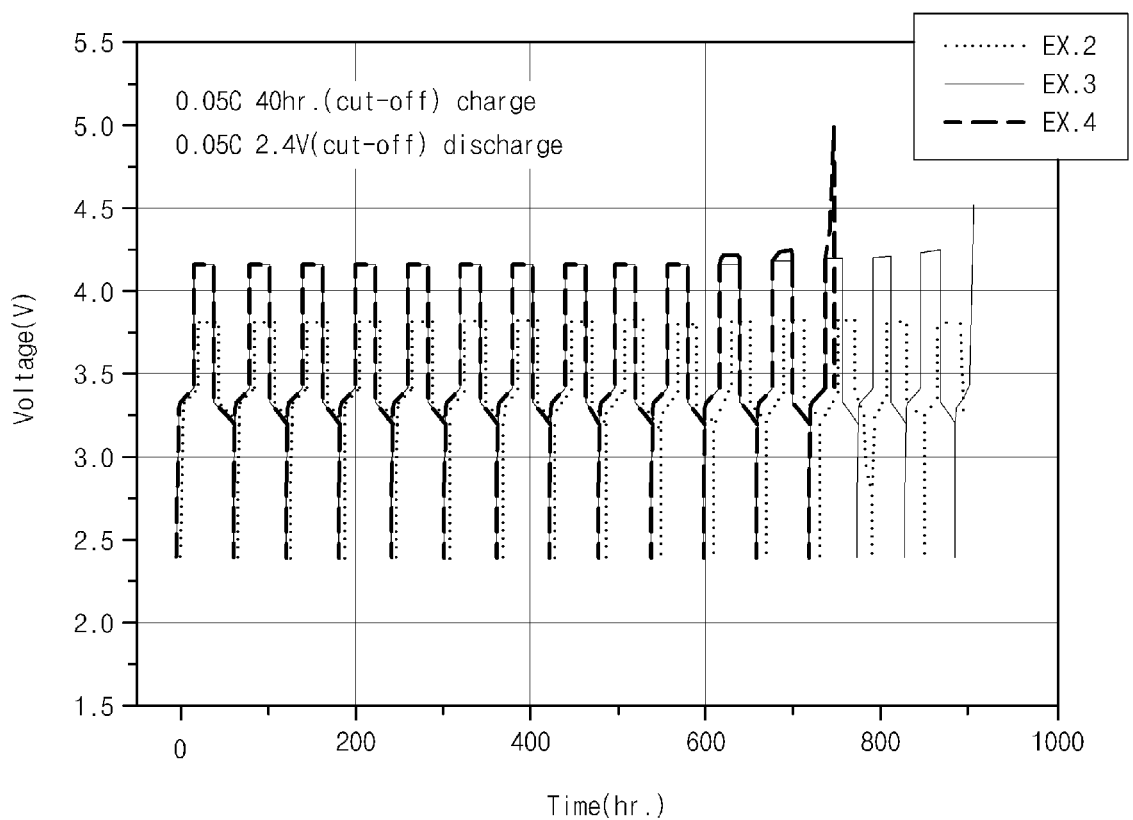
FIG. 3 is a graphic diagram showing the relationship between time and voltage according to the charge and discharge of batteries fabricated in Examples 2 to 4 of the present invention.

From the comparison between FIGS. 3 and 4, it can be seen that, in the batteries fabricated in Examples 2 to 4, i.e., the batteries comprising vinylene carbonate and propylene sultone as the inventive electrolyte additives, the life cycle of the redox shuttle additive was increased, and thus the charge/discharge life cycle of the batteries in Examples 2 to 4 was increased by at least two times as compared to that of the batteries fabricated in Comparative Examples 2 to 4.

When the batteries fabricated in Examples 2 to 6 and Comparative Examples 2 to 4 were tested in the same conditions as described above, the number of cycles, where the potential of the batteries was not increased to 5V, was measured, and the measurement results were shown in Table 1 below.

TABLE 1

| | Number of cycles which resisted overcharge |
|---|---|
| Example 2 | >15 |
| Example 3 | 12 |
| Example 4 | 15 |
| Example 5 | 8 |
| Example 6 | 9 |
| Comparative Example 2 | 3 |
| Comparative Example 3 | 4 |
| Comparative Example 4 | 5 |

As can be seen in Table 1 above, the batteries fabricated in Examples 2 to 6 had a greatly increased number of cycles which resisted overcharge, compared to those of the batteries fabricated in Comparative Examples 2 to 4. This suggests that the battery according to the present invention has improved safety upon overcharge, and the reduction in the performance thereof is inhibited.

As described above, according to the present invention, at least one compound selected from the group consisting of vinylene carbonates, ethylene carbonates, cyclic sulfites and unsaturated sultones is added to an electrolyte, such that the reaction between a redox shuttle additive in the electrolyte and an anode can be inhibited and the life cycle of the redox shuttle additive that undergoes oxidation-reduction cycling can be improved. Also, by virtue of the redox shuttle additive having improved life cycle, a secondary battery of the present invention can ensure excellent stability upon overcharge and, at the same time, can minimize the reduction in performance, caused by the use of additives.

While this invention has been described in connection with what is presently considered to be the most practical and preferred embodiment, it is to be understood that the invention is not limited to the disclosed embodiment and the drawings. On the contrary, it is intended to cover various modifications and variations within the spirit and scope of the appended claims.

What is claimed is:

1. A method for inhibiting the reduction of life cycle of a redox shuttle additive in a secondary battery that undergoes oxidation-reduction cycling comprising the steps of:
    preparing the secondary battery comprising a cathode, an anode, a separator, and a non-aqueous electrolyte, the non-aqueous electrolyte comprises the redox shuttle additive, a non-aqueous solvent and an electrolyte salt,
    wherein the non-aqueous electrolyte comprises an inhibitor of the reduction of life cycle of the redox shuttle additive consisting of a combination of vinylene carbonates represented by Formula 1, and unsaturated sultones represented by Formula 4:

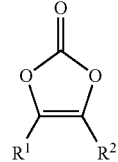

[Formula 1]

wherein $R^1$ and $R^2$ each independently represents halogen, an alkyl group having 1~12 carbon atoms;

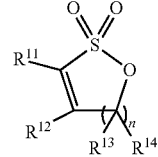

[Formula 4]

wherein $R^{11}$ to $R^{14}$ each independently represents halogen, or an alkyl group having 1~12 carbon atoms, and n is an integer ranging from 0 to 3.

2. The method of claim 1, wherein the vinylene carbonates and unsaturated sultones are compounds that form a film on the surface of an anode.

3. The method of claim 1, wherein the redox shuttle additive is an aromatic compound represented by Formula 5:

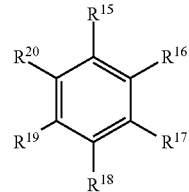

[Formula 5]

wherein $R^{15}$ to $R^{20}$ each independently represents hydrogen, halogen, aryl, an alkyl group having 1~12 carbon atoms, or an alkoxy group having 1~12 carbon atoms, and at least two of $R^{15}$ to $R^{20}$ are an alkoxy group having 1~12 carbon atoms.

4. The method of claim 1, wherein the redox shuttle additive is at least one aromatic compound selected from among dimethoxybenzenes.

5. The method of claim 1, wherein the inhibitor is used in an amount of 0.1~10 parts by weight based on 100 parts by weight of the total electrolyte containing the redox shuttle additive.

6. The method of claim 1, wherein the redox shuttle additive is used in an amount of 0.1~20 parts by weight based on 100 parts by weight of the total electrolyte.

* * * * *